(12) United States Patent
Smolik

(10) Patent No.: US 12,077,220 B2
(45) Date of Patent: Sep. 3, 2024

(54) TAILGATE ADAPTER ASSEMBLY

(71) Applicant: NISSAN NORTH AMERICA, INC., Franklin, TN (US)

(72) Inventor: David Smolik, Windsor (CA)

(73) Assignee: Nissan North America, Inc., Franklin, TN (US)

( * ) Notice: Subject to any disclaimer, the term of this patent is extended or adjusted under 35 U.S.C. 154(b) by 291 days.

(21) Appl. No.: 17/358,651

(22) Filed: Jun. 25, 2021

(65) Prior Publication Data

US 2022/0410984 A1    Dec. 29, 2022

(51) Int. Cl.
  *B62D 33/02*    (2006.01)
  *B62D 33/023*    (2006.01)

(52) U.S. Cl.
  CPC ....... *B62D 33/0207* (2013.01); *B62D 33/023* (2013.01)

(58) Field of Classification Search
  CPC .............. B62D 33/0207; B62D 33/023; B62D 33/0273; B60R 2011/004; B60R 11/06
  USPC .................................... 296/3, 57.1; 411/429
  See application file for complete search history.

(56) References Cited

U.S. PATENT DOCUMENTS

| | | | | |
|---|---|---|---|---|
| 5,582,496 | A * | 12/1996 | Ambrico | F16B 39/12 411/932 |
| 7,077,179 | B1 * | 7/2006 | Camiano | B23D 45/065 144/1.1 |
| 7,905,532 | B2 * | 3/2011 | Johnson | B62D 33/03 296/26.11 |
| 10,703,303 | B2 * | 7/2020 | Hemphill | B62D 33/0273 |
| 2005/0062309 | A1 | 3/2005 | Juzwiak et al. | |
| 2008/0231064 | A1 * | 9/2008 | Plavetich | B60P 1/435 296/26.11 |

FOREIGN PATENT DOCUMENTS

WO    2003022634 A3    3/2003

OTHER PUBLICATIONS

Erickson Sawhorse Brackets for Truck Tailgate (Year: 2020).*

* cited by examiner

*Primary Examiner* — Amy R Weisberg
*Assistant Examiner* — Sara Laghlam
(74) *Attorney, Agent, or Firm* — Global IP Counselors, LLP

(57) ABSTRACT

A vehicle tailgate adapter assembly includes a vehicle tailgate module, a plurality of first fasteners and an adapter plate. The vehicle tailgate module has a plurality of openings. The adapter plate has a plurality of first openings that correspond to the openings of the tailgate. The first openings and the openings of the tailgate receiving the first fasteners therethrough when the adapter plate is installed to the tailgate. The adapter plate has a plurality of second openings arranged to be offset of the first openings.

18 Claims, 7 Drawing Sheets

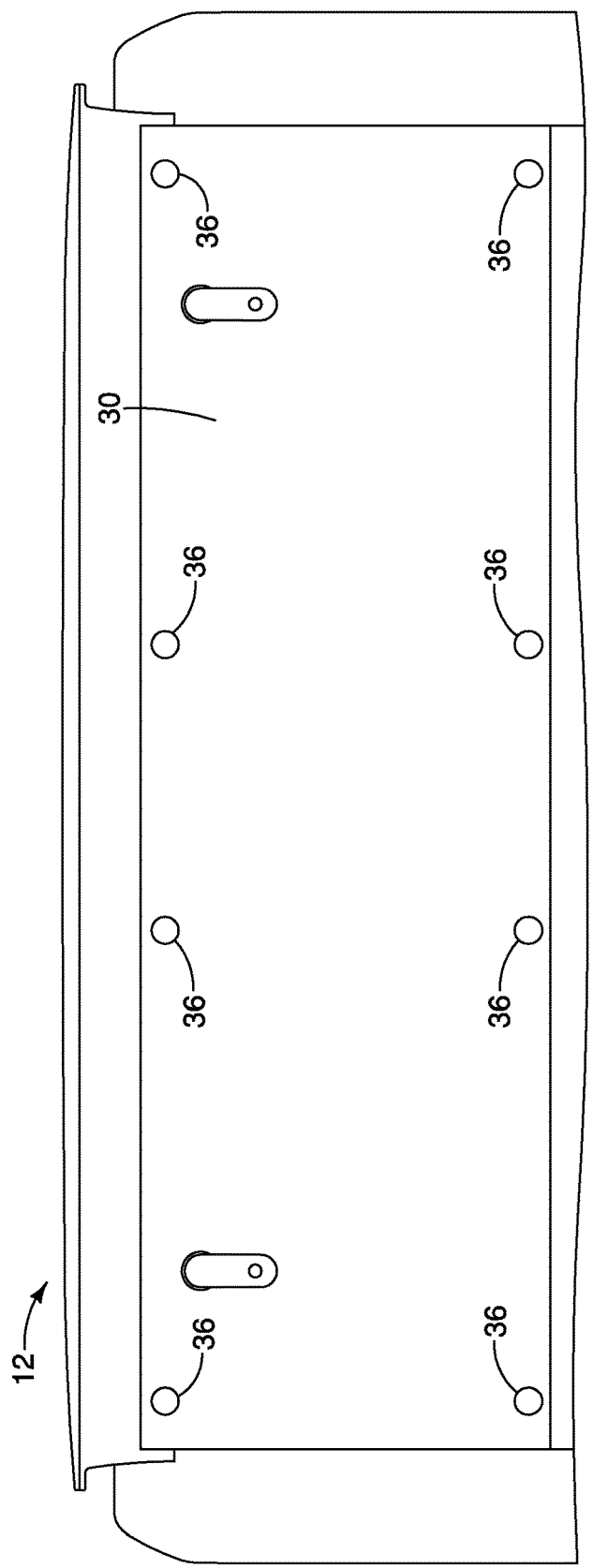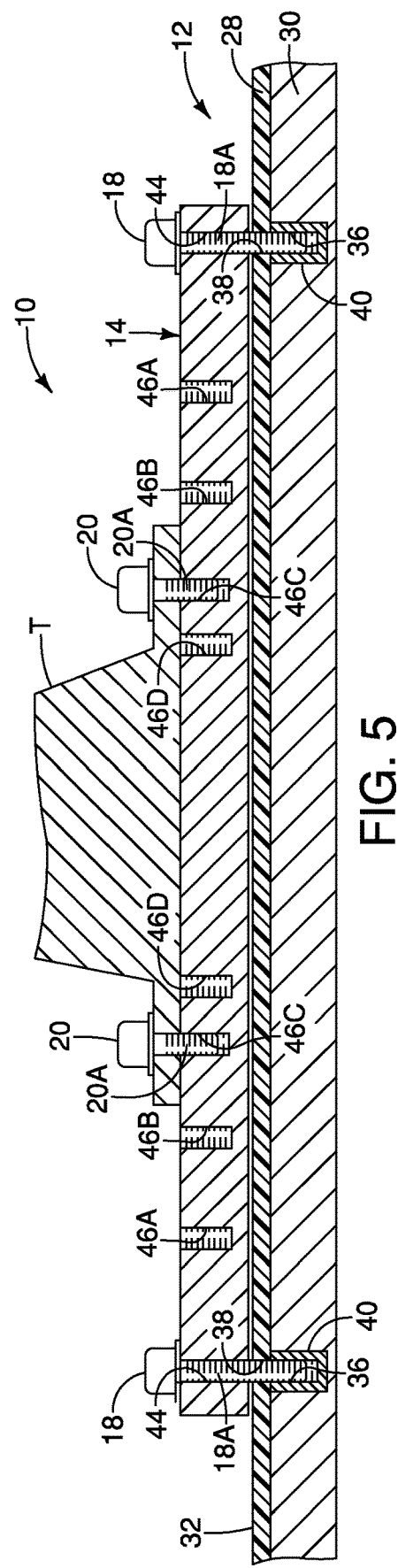

TAILGATE ADAPTER ASSEMBLY

BACKGROUND

Technical Field

The present disclosure generally relates to a tailgate adapter assembly. More specifically, the present disclosure relates to tailgate adapter assembly for a vehicle tailgate module.

Background Information

A vehicle tailgate can be considered a back "gate" or a "door" of primarily a truck but sometimes also a SUV, wagon, or similar form of vehicle that has a back door, which can be opened via hinges to load cargo or other items to a vehicle's storage area. The tailgate can be let down in a pickup truck in order to get up in the bed and load furniture or other items in which you need to move from one location to another.

SUMMARY

In view of the state of the known technology, one aspect of the present disclosure is to provide a vehicle tailgate adapter assembly comprising a vehicle tailgate module, a plurality of first fasteners and an adapter plate. The vehicle tailgate module has a plurality of openings. The adapter plate has a plurality of first openings that correspond to the openings of the tailgate. The first openings and the openings of the tailgate receiving the first fasteners therethrough when the adapter plate is installed to the tailgate. The adapter plate has a plurality of second openings arranged to be offset of the first openings.

BRIEF DESCRIPTION OF THE DRAWINGS

Referring now to the attached drawings which form a part of this original disclosure:

FIG. 4 is a metal panel of the tailgate module of FIG. 1 that is compatible with the adapter plate;

FIG. 5 is a cross-sectional view of a power tool installed to the tailgate module via the adapter plate;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
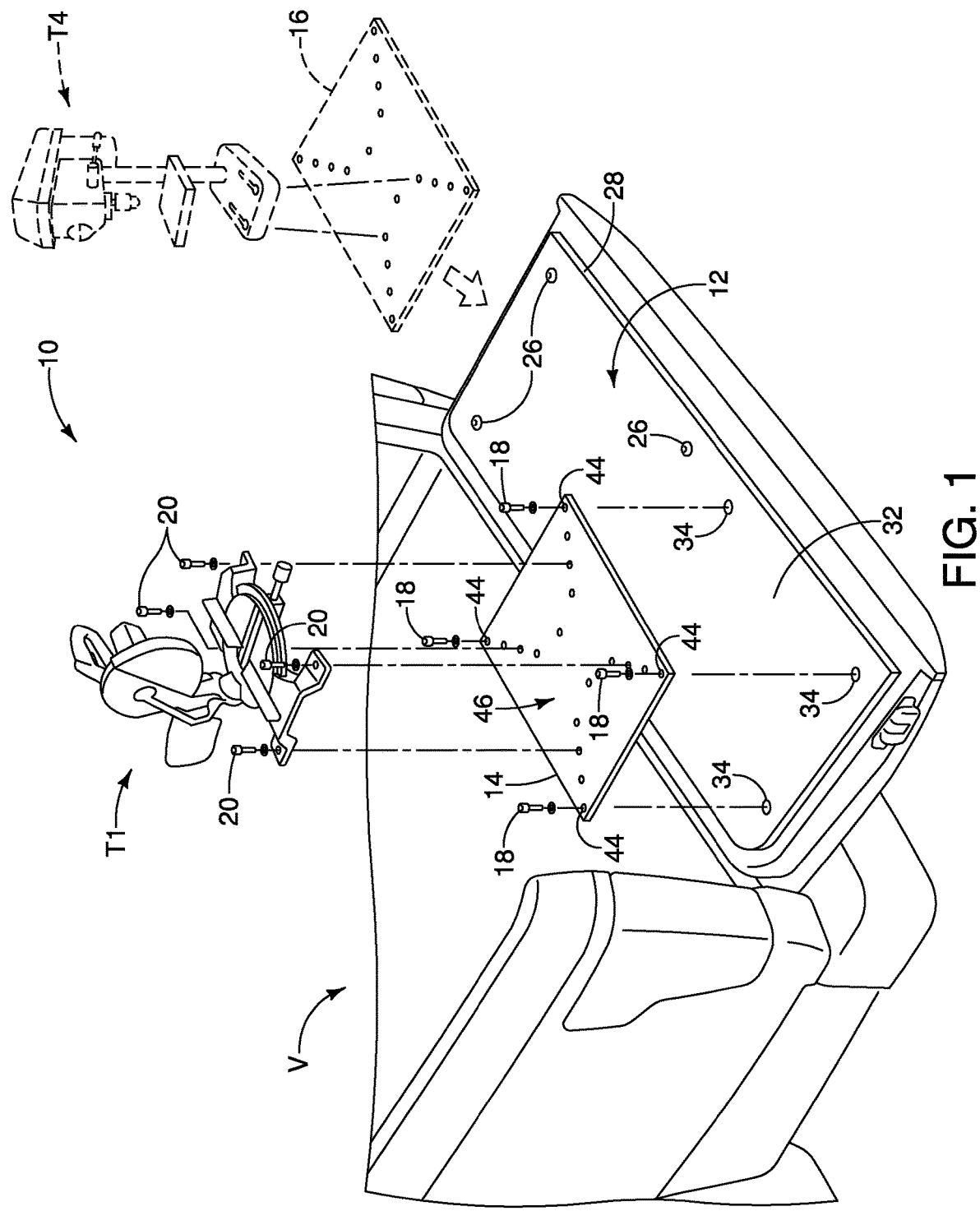
FIG. 1 is a tailgate adapter assembly installable to a tailgate module in accordance with an illustrated embodiment.
Figure 2:
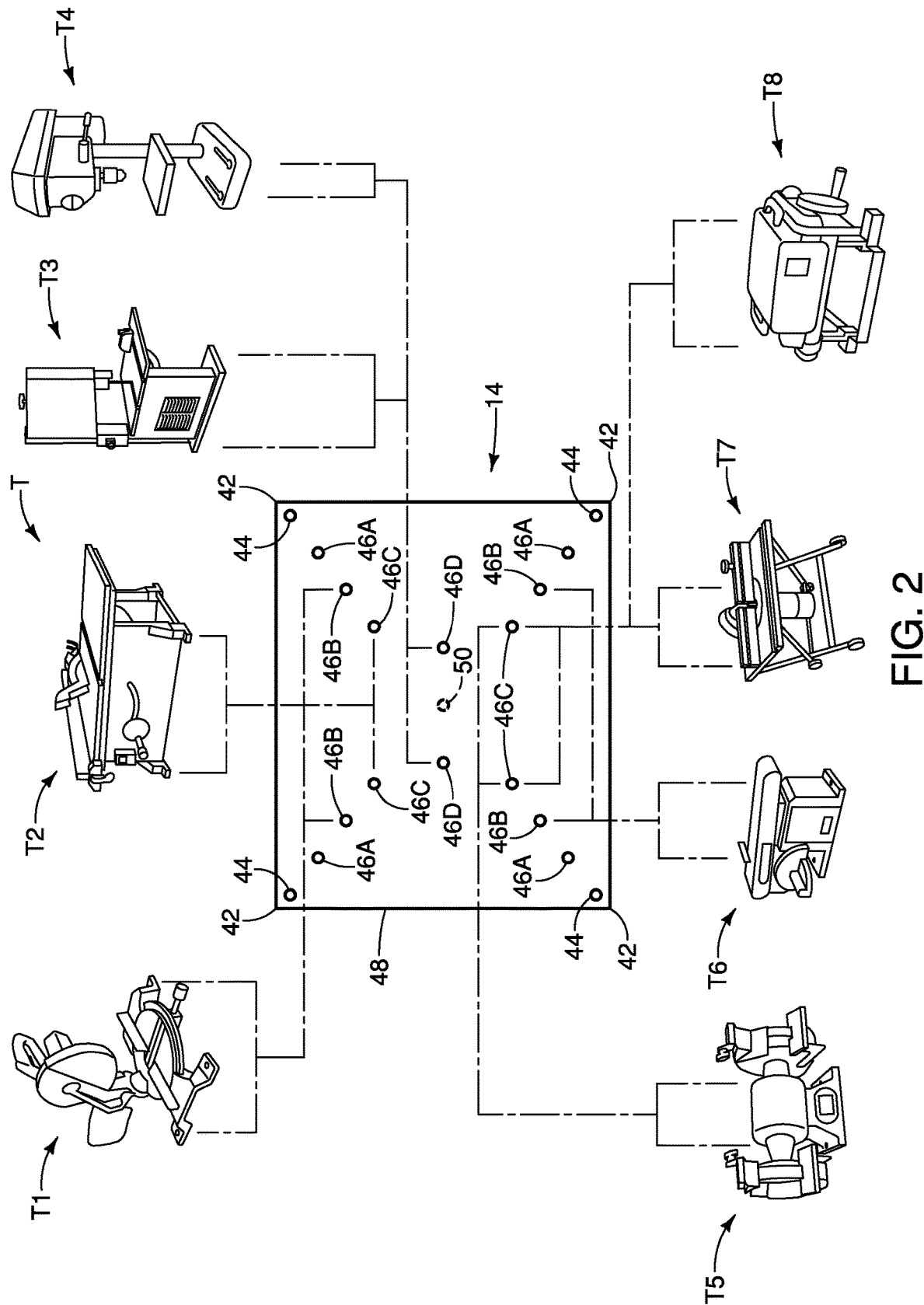
FIG. 2 is a plan view of an adapter plate of the tailgate adapter assembly of FIG. 1.
Figure 3:
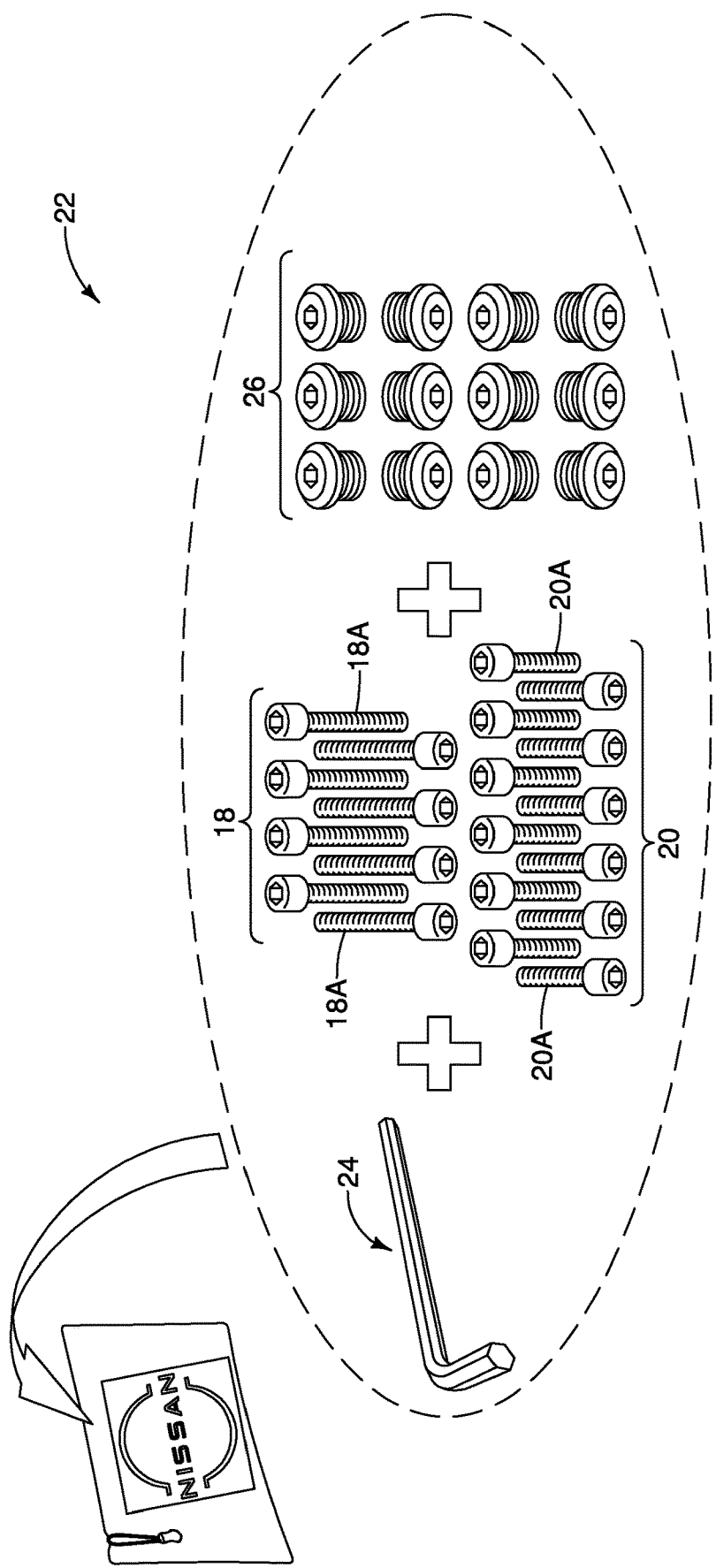
FIG. 3 is an installation kit of the tailgate adapter assembly of FIG. 1.

Referring initially to FIGS. 1 to 3, a tailgate adapter assembly 10 is illustrated in accordance with an illustrated embodiment. The tailgate adapter assembly 10 is compatible with a vehicle V having a vehicle tailgate module 12. In the illustrated embodiment, the vehicle V is a pickup truck. The tailgate adapter assembly 10 comprises the vehicle tailgate module 12 and an adapter plate 14 to be supported to the tailgate module 12. The tailgate module 12 is movable between an open and a closed position to allow access to the vehicle's V rear storage area (e.g., truck bed).

In the illustrated embodiment, the adapter plate 14 is removably installed to the tailgate module 12 in order to mount one or more power tools T to the tailgate module 12 via the adapter plate 14. While the vehicle V is illustrated as being a pickup truck, it will be apparent to those skilled in the vehicle field from this disclosure that the tailgate module 12 can be provided with a sports utility vehicle or a wagon having a back door or rear hatch.

As seen in FIG. 1, the tailgate module 12 of the illustrated embodiment is compatible to have a pair of adapter plates 14 and 16 installed thereon. As shown, the tailgate module 12 is capable of having the adapter plates 14 and 16 installed side by side to concurrently mount a plurality of power tools T1 to T8 (FIG. 2) to the tailgate module 12. Therefore, the tailgate adapter assembly 10 of the illustrated embodiment can include the pair of adapter plates 14 and 16. However, it will be apparent to those skilled in the vehicle field from this disclosure that the tailgate module 12 can be modified to have different numbers of adapter plates 14 and 16 installed thereon. As the adapter plates 14 and 16 are identical, only the adapter plate 14 will be further described herein.

In the illustrated embodiment, the tailgate adapter assembly 10 further comprises a plurality of first fasteners 18 and a plurality of second fasteners 20, as best seen in FIGS. 1 and 2. The first fasteners 18 are provided to attach the adapter plate 14 to the tailgate module 12. Each of the first fasteners 18 include threaded portions 18A that engage with the openings of the tailgate module 12. The second fasteners 20 are provided to attach one or more power tools T to the adapter plate 14. Each of the second fasteners 20 include threaded portions 20A that engage with the openings of the adapter plate 14, as will be described below.

As seen in FIG. 3, in the illustrated embodiment, the first and second fasteners 18 and 20 can be provided as part of an installation kit 22 that is to be used with the adapter plate 14 to install the adapter plate 14 to the tailgate module 12. Therefore, preferably, the tailgate adapter assembly 10 includes the installation kit 22. As shown, the installation kit 22 further includes a fastening tool 24, such as an Allen wrench, that is compatible with the first and second fasteners 18 and 20. The tailgate adapter assembly 10 further comprises a plurality of caps 26. That is, the installation kit 22 further includes the caps 26 that are preferably preinstalled to the tailgate module 12, as seen in FIG. 1.

As stated, the tailgate adapter plate 14 assembly is provided in order to mount one or more power tools T to the tailgate module 12. In this way, the vehicle V user can travel to perform heavy duty work while working at the vehicle V in various destinations. Referring to FIG. 2, examples of power tools T1-T8 that can be compatible with the tailgate adapter assembly 10 include a milter saw T1, a table saw T2, a band saw T3, a drill press T4, a bench grinder T5, a belt sander T6, a router table T7, and a wood planter T8.

The power tools T are removably installed to the adapter plate 14 that is installed to the tailgate so that different power tools (e.g., the power tools T1 to T8) can be mounted to the tailgate module 12 in succession. It will be apparent to those skilled in the vehicle field from this disclosure that the power tools T1 to T8 illustrated are examples only and that the tailgate adapter assembly 10 can be compatible with additional types of tools and equipment that can be fastened to the adapter plate 14.

Referring to FIGS. 1, 4 and 5, the vehicle tailgate module 12 has a trim panel 28 fitted over a metal panel 30 (e.g., sheet metal). The trim panel 28 and the metal panel 30 can be attached by conventional methods, such as adhesive, welding and mechanical attachment means. The edges of the trim panel 28 can also wrap over the metal panel 30. The trim panel 28 can be molded of either thermoset or thermoplastic materials by injection molding, compression molding, blow molding, thermoforming, rotational molding, transfer molding and the like. The trim panel 28 is preferably made of appropriate engineering thermoplastic having high wear resistance, color stability, toughness and dimensional stability. The trim panel 28 has a top surface 32 that defines the top surface 32 of the tailgate module 12. The top surface 32 can be textured to assist in ease of placing and holding construction materials while work is being performed on them.

As seen in FIG. 1, the top surface 32 of the tailgate module 12 has a plurality of openings 34 for receiving the first fasteners 18 that attach the adapter plate 14 to the tailgate module 12. The openings 34 lead to a corresponding one of threaded openings 36 that engage the first fasteners 18. The metal panel 30 has the threaded openings 36, as seen in FIG. 5. Thus, the trim panel 28 has a plurality of through holes 38 that include the openings 34 of the top surface 32. Preferably the through holes 38 are non-threaded. The through holes 38 lead to a corresponding one of the threaded openings 36 in the metal panel 30.

In the illustrated embodiment, the metal panel 30 is premade having the threaded openings 36 preformed therein. The metal panel 30 can be drilled to have the threaded openings 36. Preferably, the tailgate module 12 can include a plurality of nuts 40 that are pre-welded to the metal panel 30 that define the threaded openings 36 that receive the first fasteners 18. The nuts 40 can be, for example, rivet nuts and/or weld nuts that are pre-welded to the body of the metal panel 30.

As seen in FIGS. 1 and 4, the metal panel 30 includes four threaded openings 36 to install a first adapter plate 14 thereon. The metal panel 30 of the illustrated embodiment further includes an additional four threaded openings 36 to install a second adapter plate 14 thereon. The trim panel 28 includes four through holes 38 for installing the first adapter plate 14. The trim panel 28 includes four additional through holes 38 for installing the second adapter plate 14. Thus, the tailgate module 12 of the illustrated embodiment is designed to have the pair of adapter plates 14 and 16 installed thereon. However, it will be apparent to those skilled in the vehicle field from this disclosure that the tailgate module 12 can be modified to have different numbers of threaded openings 36 and through holes 38 as necessary.

As seen in FIGS. 1 and 3, the caps 26 are pre-installed to the threaded openings 36 in the tailgate module 12. That is, the vehicle V is provided to the customer as having the caps 26 installed into the tailgate module 12. Therefore, the caps 26 are threaded. The caps 26 are threadedly provided to the threaded openings 36 of the metal panel 30 and are also installed to the through holes 38 of the trim panel 28.

Therefore, the caps 26 cover the openings 34 on the top surface 32 of the tailgate module 12. The caps 26 are provided to prevent water intrusion into the threaded openings 36. The caps 26 are removably provided to the openings 34 of the tailgate module 12 and are removed so that the openings 34 of the tailgate module 12 receive the first fasteners 18. That is, the caps 26 are removed so to install the adapter plate 14 to the tailgate module 12. In the illustrated embodiment, the caps 26 can also be any type of threaded opening cover.

Referring to FIGS. 1, 2 and 5, the adapter plate 14 is a rigid one-piece sheet of metal, such as aluminum or steel. The adapter plate 14 of the illustrated embodiment preferably has a square or rectangular shape having four corners 42. The adapter plate 14 includes a plurality of first openings 44. The first openings 44 correspond to the threaded openings 36 of the tailgate module 12. The first openings 44 also correspond to the through holes 38 of the trim panel 28. As seen in FIG. 3, the first openings 44, the through holes 38 and the threaded openings 36 of the tailgate module 12 receive the first fasteners 18 therethrough when the adapter plate 14 is installed to the tailgate module 12. Therefore, the first openings 44 of the adapter plate 14 are threaded.

As best seen in FIG. 1, each of the first openings 44 are arranged adjacent to one of the corners 42 of the adapter plate 14. Thus, in the illustrated embodiment, the first openings 44 include four first openings 44. However, it will be apparent to those skilled in the vehicle field from this disclosure that the adapter plate 14 can be modified to have different shapes such that there are additional numbers of first openings 44 for attaching the adapter plate 14 to the tailgate module 12.

The adapter plate 14 further includes a plurality of second openings 46 that are arranged offset of the first openings 44. The second openings 46 receive the second fasteners 20 to attach the power tools T to the adapter plate 14. The second openings 46 of the adapter plate 14 are threaded so that the second fasteners 20 are threaded to the second openings 46. As best seen in FIG. 5, the first and second openings 44 and 46 extend partway into the sheet of the adapter plate 14. However, it will be apparent to those skilled in the vehicle field from this disclosure that the first and second openings 44 and 46 can alternatively extend through an entire thickness of the adapter plate 14 if desired. Preferably, the first openings 44 of the adapter plate 14 are arranged closer to a perimeter 48 of the adapter plate 14 than the second openings 46 are arranged to the perimeter 48. That is, the first openings 44 are preferably the outermost openings of the adapter plate 14. Therefore, the adapter plate 14 is attached to the tailgate module 12 at the first openings 44 that are the outermost openings.

As seen in FIGS. 1 and 2, the second openings 46 include a first set of second openings 46A that are arranged farther from the corners 42 (e.g., towards a center point 50) than the first openings 44. The second openings 46 include a second set of second openings 46B that are arranged farther from the corners 42 than the first set of second openings 46A. The second openings 46 further include a third set of second openings 46C that are arranged farther from the corners 42 than the second set of second openings 46B. In the illustrated embodiment, the second openings 46 further include a fourth set of second openings 46D that are arranged adjacent to the center point 50 of the adapter plate 14. It will be apparent to those skilled in the vehicle field from this disclosure that the adapter plate 14 can include additional or fewer ones of the second openings 46 as desired and/or necessary.

As seen in FIG. 2, the arrangement of the second openings 46 of the adapter plate 14 enable power tools T of different shapes to be installed on the adapter plate 14. For example, the milter saw T1 can be installed to two of the second set of second openings 46B, while the table saw T2 can be installed to two of the third set of second openings 46C. That is, as power tools T tend to have rectangular or square bottoms, the second openings 46 are arranged to accommodate different rectangular or square bottoms of different sizes. The compatibility of the power tools T1 to T8 of FIG. 2 with respect to the second openings 46 are illustrated as examples only.

In the illustrated embodiment, during installation of the adapter plate 14 to the tailgate module 12, the caps 26 are removed from the openings 34 of the tailgate module 12. The adapter plate 14 is mounted to the top surface 32 of the tailgate module 12 so that the first fasteners 18 are installed through the first openings 44 of the adapter plate 14, the through holes 38 and the threaded openings 36 of the metal panel 30. Therefore, the adapter plate 14 is preferably mounted to the tailgate module 12 first and then the power tool T is installed to the adapter plate 14. As shown in FIG. 5, the first fasteners 18 have threaded portions 18A that are longer than the threaded portions 20A of the second fasteners 20. In this way, the first fasteners 18 can extend into the metal panel 30. The second fasteners 20 extend into second openings 46 without going through the entire thickness of the adapter plate 14.

Referring now to FIGS. 6 to 9, a modified tailgate adapter assembly 110 is illustrated. Due to the similarity between the modified tailgate adapter assembly 110 and the tailgate adapter assembly 10, components of the modified tailgate adapter assembly 110 that are identical to corresponding components of the tailgate adapter assembly 10 will receive the same reference numerals. Components of the modified tailgate adapter assembly 110 that have been modified will receive identical reference numerals as corresponding components of the tailgate adapter assembly 10 but increased by 100.

Figure 9:
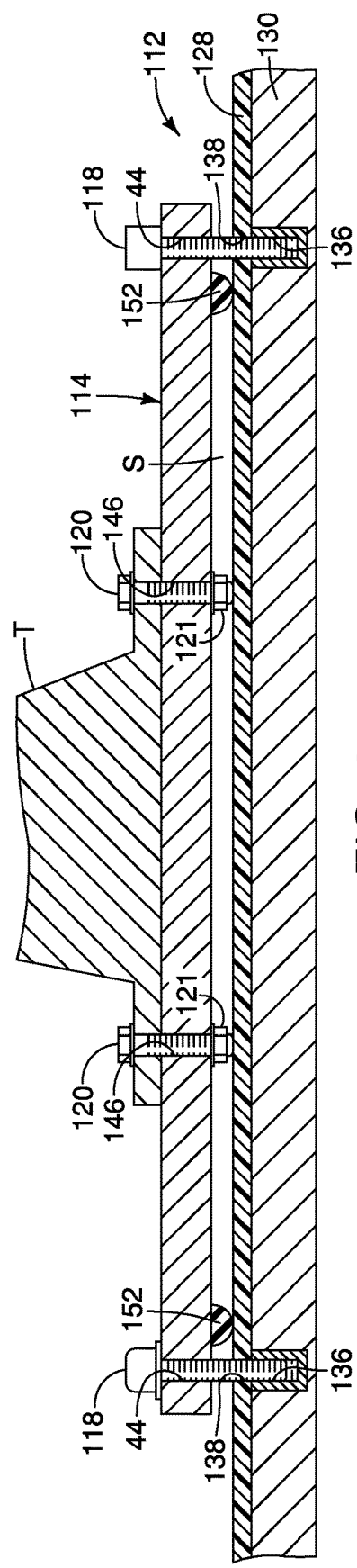
FIG. 9 is a cross-sectional view of a power tool installed to the modified tailgate module via the modified adapter plate.

The modified tailgate adapter assembly 110 comprises a modified adapter plate 114 that can be supported to the tailgate module 12 of FIG. 1. However, in FIGS. 6 and 9, the modified adapter plate 114 is illustrated as being compatible with a modified tailgate module 112 that supports the modified adapter plate 114 at a center of the modified tailgate module 112. Therefore, the modified tailgate module 112 is pre-formed to have threaded openings 136 in a manner similar to the tailgate module 12 but repositioned to support the modified tailgate module 112 in the center of the tailgate module 112. In particular, as seen in FIG. 9, the modified tailgate module 112 includes a metal plate 130 with threaded openings 136 and a trim panel 128 with through holes 138 for mounting the modified adapter plate 114 thereon.

Figure 6:
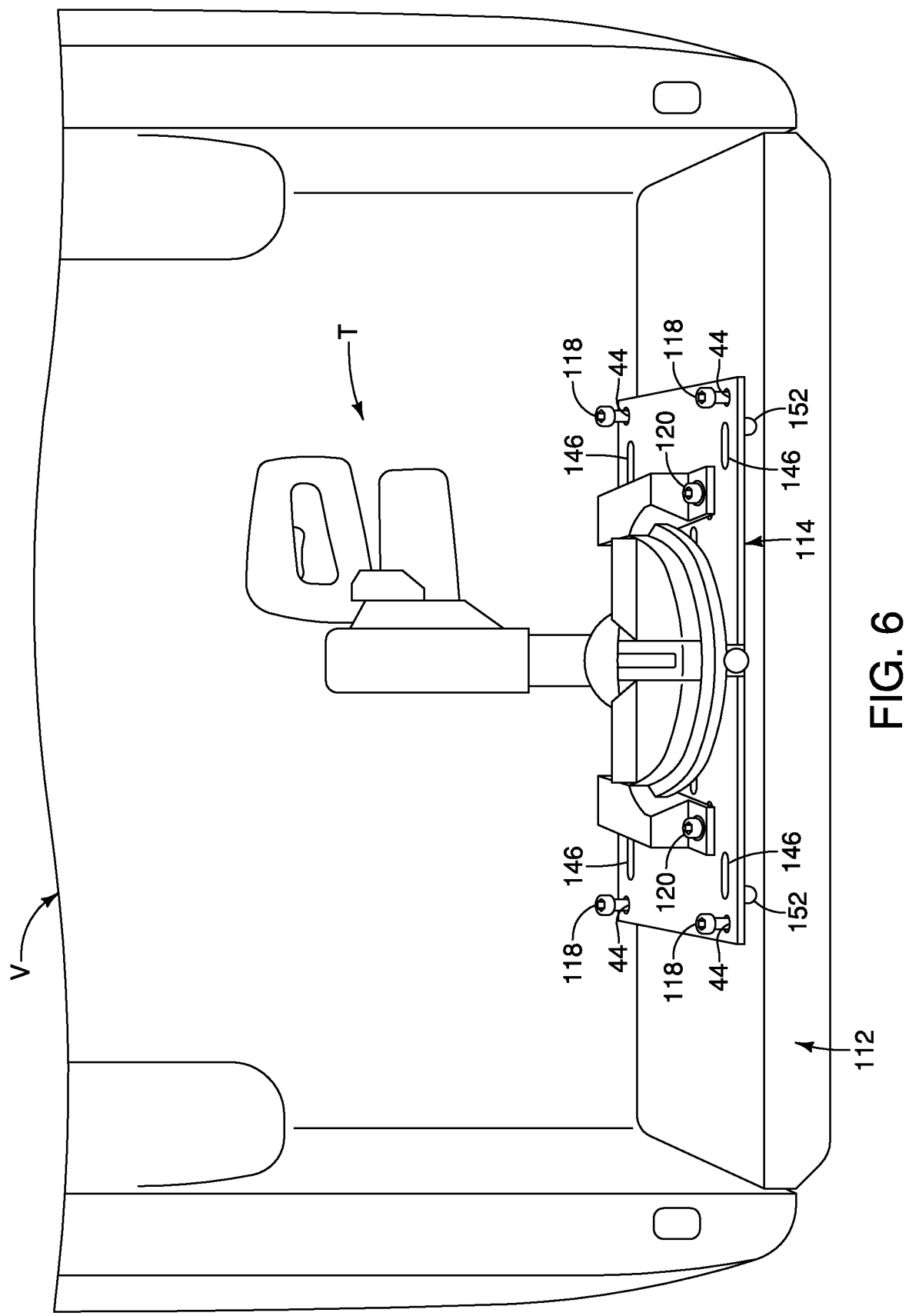
FIG. 6 is a modified tailgate adapter assembly installed to a modified tailgate module in accordance with an illustrated embodiment.
Figure 7:
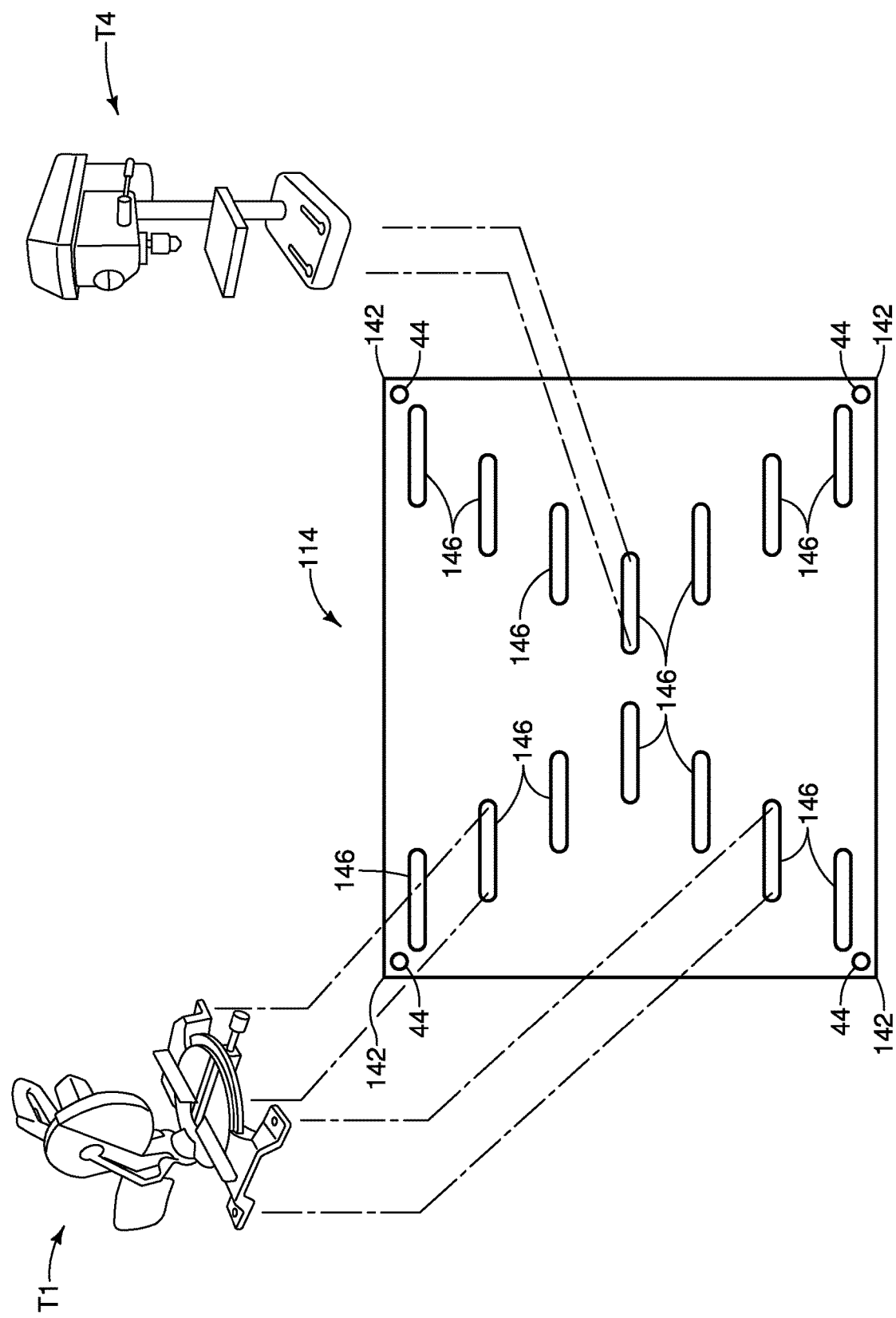
FIG. 7 is a plan view of a modified adapter plate of the modified tailgate adapter assembly of FIG. 6.

It will be apparent to those skilled in the vehicle field from this disclosure that the modified adapter plate 114 can be compatible with either one of the tailgate modules 12 and 112 of FIG. 1 and FIG. 6. For simplicity, the modified adapter plate 114 will be described as being mounted to the modified tailgate module 112. As seen in FIG. 7, the modified adapter plate 114 is provided to mount power tools T to the tailgate module 112 via the modified adapter plate 114.

Figure 8:
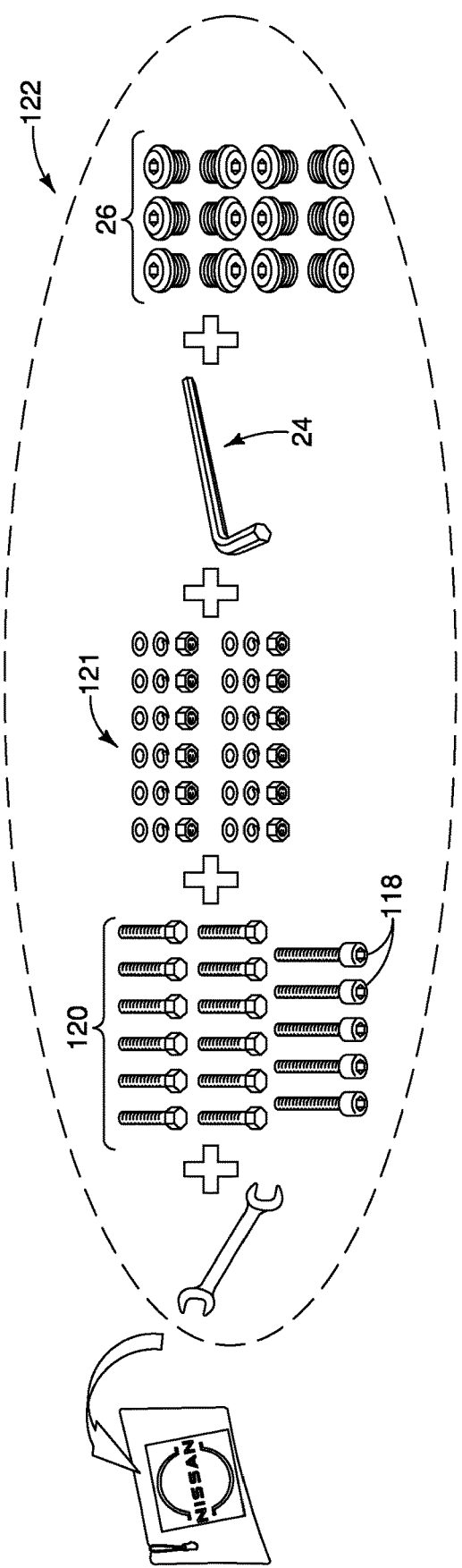
FIG. 8 is a modified installation kit of the modified tailgate adapter assembly of FIG. 6.

As seen in FIG. 8, the modified tailgate adapter assembly 110 further comprises a modified installation kit 122. The modified installation kit 122 includes a plurality of first fasteners 118, a plurality of second fasteners 120 and a plurality of nuts 121. The first fasteners 118 are threaded fasteners provided to attach the modified adapter plate 114 to the modified tailgate module 112. The second fasteners 120 are provided to attach one or more power tools T to the modified adapter plate 114.

As shown, the modified installation kit 122 further includes a fastening tool 24, such as an Allen wrench that is compatible with the fasteners 118 and 120. The tailgate adapter assembly further comprises a plurality of caps 26 that are identical to the caps 26 of the FIG. 1. That is, the modified installation kit 122 further includes the caps 26 that are preferably preinstalled to the modified tailgate module 112 in the same manner as described in tailgate adapter assembly 10 described above.

Referring to FIGS. 7 and 9, the modified adapter plate 114 is a rigid one-piece sheet of metal, such as aluminum or steel. The modified adapter plate 114 of the illustrated embodiment preferably has a square or rectangular shape having four corners 142. The modified adapter plate 114 includes a plurality of first openings 44 that are identical in form and function to the first openings 44 of adapter plate 14. As best seen in FIG. 7, each of the first openings 44 are arranged adjacent to one of the corners 142 of the modified adapter plate 114.

The modified adapter plate 114 further includes a plurality of modified second openings 146 that are arranged offset of the first openings 44. The modified second openings 146 are elongated to be slots 146. The slots 146 enable the power tools T to be adjustable along the slots 146 of the modified adapter plate 114. The second fasteners 120 attach the power tools T through the slots 146.

As best seen in FIG. 6, the modified adapter plate 114 further includes a plurality of spacers 152 or feet. That is, the modified adapter plate 114 includes a sheet metal body that sits on spacers 152 when the modified adapter plate 114 is installed to the modified tailgate module 112. The spacers 152 can be rubber feet that are fixed to the body of the modified adapter plate 114 by conventional means, such as by adhesive. The body of the modified adapter plate 114 can alternatively be made to have spacers 152 integrally formed thereon.

The spacers 152 create a space S between the body of the modified adapter plate 114 and the modified tailgate module 112 to accommodate the nuts 121 that will engage the first fasteners 118, as seen in FIG. 9. As shown, the second fasteners 120 extend through the slots 146 of the modified adapter plate 114 to sit on the tailgate module 112, in particular the trim panel 128. The first fasteners 118 extend through the first openings 44 of the modified adapter plate 114 extend through into the threaded openings 136 of the metal panel 130.

It will be apparent to those skilled in the vehicle field from this disclosure that a further modified adapter plate (not shown) can be provided as being identical to the modified adapter plate 114 so to have the spacers 152, but with the slots 146 being replaced with second openings 46 as with the adapter plate 14. It will be apparent to those skilled in the vehicle field from this disclosure that a further modified adapter plate (not shown) can be provided being identical to the adapter plate 114 to have the slots 146 but without the spacers 152 such that the second fasteners 120 extend only partway into the slots 146 as with the second openings 46 of the adapter plate 14.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the tailgate adapter assembly. Accordingly, these terms, as utilized to describe the present invention should be interpreted relative to a vehicle equipped with the tailgate adapter assembly.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle tailgate adapter assembly comprising:
   a vehicle tailgate module having a plurality of openings;
   a plurality of first fasteners, each of the first fasteners having a tool engagement portion and a threaded portion;
   an adapter plate having a plurality of first openings that correspond to the openings of the tailgate, the first openings and the openings of the tailgate receiving the threaded portions of the first fasteners therethrough when the adapter plate is installed to the tailgate such that the adapter plate is disposed between the tool engagement portions of the first fasteners and the vehicle tailgate module, the adapter plate having a plurality of second openings arranged to be offset of the first openings, the first openings of the adapter plate being arranged closer to a perimeter of the adapter plate than the second openings are arranged to the perimeter; and
   a plurality of second fasteners for supporting a power tool to the adapter plate, the second openings of the adapter plate receiving the second fasteners therethrough when the power tool is installed to the adapter plate.

2. The vehicle tailgate adapter assembly according to claim 1, wherein
   the openings of the tailgate module are threaded.

3. The vehicle tailgate adapter assembly according to claim 2, wherein
   the threaded portions of the first fasteners engage with the openings of the tailgate module.

4. The vehicle tailgate adapter assembly according to claim 3, wherein
   the first openings of the adapter plate are threaded.

5. The vehicle tailgate adapter assembly according to claim 4, wherein
   the second openings of the adapter plate are threaded.

6. The vehicle tailgate adapter assembly according to claim 5, wherein
   each of the second fasteners include threaded portions that engage with the second openings.

7. The vehicle tailgate adapter assembly according to claim 6, further comprising
   a plurality of caps being removably provided to the openings of the tailgate module and are removed so that the openings of the tailgate module receive the first fasteners.

8. The vehicle tailgate adapter assembly according to claim 7, wherein
   the caps are threaded.

9. The vehicle tailgate adapter assembly according to claim 1, wherein
   the adapter plate has a square shape having four corners.

10. The vehicle tailgate adapter assembly according to claim 9, wherein
    the first openings include four first openings, each of the first openings being arranged adjacent to one of the corners of the adapter plate.

11. The vehicle tailgate adapter assembly according to claim 10, wherein
    the second openings include a first set of second openings that are arranged farther from the corners than the first openings.

12. The vehicle tailgate adapter assembly according to claim 11, wherein
    the second openings include a second set of first openings that are arranged farther from the corners than the first set of second openings.

13. The vehicle tailgate adapter assembly according to claim 12, wherein
    the second openings include a third set of second openings that are arranged adjacent to a center point of the adapter plate.

14. The vehicle tailgate adapter assembly according to claim 1, wherein
    the tailgate module includes a metal panel that has the openings.

15. The vehicle tailgate adapter assembly according to claim 14, wherein
    the tailgate module includes a trim panel having trim openings that correspond to the openings of the metal panel.

16. The vehicle tailgate adapter assembly according to claim 15, wherein
    the openings of the metal panel are threaded and the trim openings are non-threaded.

17. The vehicle tailgate adapter assembly according to claim 16, wherein further comprising a plurality of caps being threadedly provided to the openings of the metal panel and provided to the trim openings.

18. A method for installing a power tool adapter plate to a tailgate module, the method comprising:
- removing at least one cap of the tailgate module from an opening of the tailgate module;
- mounting an adapter plate to a top surface of the tailgate module, the adapter plate having a plurality of first openings that correspond to the opening of the tailgate, the adapter plate further having a plurality of second openings arranged to be offset of the first openings;
- installing at least one first fastener through a first opening of the adapter plate by threading a threaded portion of the first fastener through the first opening from the top surface of the tailgate module; and
- installing the at least one first fastener through the opening of the tailgate module by threading the threaded portion of the first fastener into the opening of the tailgate module, the first openings of the adapter plate being arranged closer to a perimeter of the adapter plate than the second openings are arranged to the perimeter; and
- installing a plurality of second fasteners for supporting a power tool to the adapter plate, the second openings of the adapter plate receiving the second fasteners therethrough when the power tool is installed to the adapter plate.

* * * * *